United States Patent

Jones

(10) Patent No.: US 6,924,841 B2
(45) Date of Patent: Aug. 2, 2005

(54) SYSTEM AND METHOD FOR CAPTURING COLOR IMAGES THAT EXTENDS THE DYNAMIC RANGE OF AN IMAGE SENSOR USING FIRST AND SECOND GROUPS OF PIXELS

(75) Inventor: Robert W. Jones, Corvallis, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 772 days.

(21) Appl. No.: 09/847,968

(22) Filed: May 2, 2001

(65) Prior Publication Data

US 2002/0163583 A1 Nov. 7, 2002

(51) Int. Cl.[7] .......................... H04N 5/335; H04N 3/14
(52) U.S. Cl. ................. 348/294; 348/241; 348/222.1; 348/273; 348/362; 382/167
(58) Field of Search ...................... 348/294, 296, 348/301, 302, 308, 222.1, 241, 243, 229.1, 362, 367, 272, 273; 358/443, 518; 382/167

(56) References Cited

U.S. PATENT DOCUMENTS

| | | | | |
|---|---|---|---|---|
| 4,647,975 A | | 3/1987 | Alston et al. ............... 358/213 |
| 6,115,065 A | * | 9/2000 | Yadid-Pecht et al. ....... 348/308 |
| 6,137,100 A | * | 10/2000 | Fossum et al. .......... 250/208.1 |
| 6,204,881 B1 | | 3/2001 | Ikeda et al. ................. 348/362 |
| 6,275,259 B1 | * | 8/2001 | Gowda et al. ........... 348/229.1 |
| 6,388,709 B1 | * | 5/2002 | Kobayashi et al. ......... 348/362 |
| 6,646,246 B1 | * | 11/2003 | Gindele et al. .......... 250/208.1 |
| 6,697,114 B1 | * | 2/2004 | Merrill ....................... 348/308 |
| 6,710,804 B1 | * | 3/2004 | Guidash ..................... 348/302 |
| 6,724,426 B1 | * | 4/2004 | Berezin et al. ............. 348/308 |
| 6,765,611 B1 | * | 7/2004 | Gallagher et al. ....... 348/222.1 |
| 2002/0130957 A1 | * | 9/2002 | Gallagher et al. .......... 348/222 |

* cited by examiner

*Primary Examiner*—Wendy R. Garber
*Assistant Examiner*—Justin Misleh (57) ABSTRACT

A technique for digitally capturing a high contrast color image involves simultaneously capturing image data from bright and dark areas using an image sensor with pixels of the same color that have different sensitivities to the bright and dark areas. The image data from the different sensitivity pixels is then used to generate a final image that includes features from both the bright and dark areas. An embodiment of a digital imaging system includes an image sensor with a first group of pixels that have a first sensitivity to a first color and a second group of pixels that have a second sensitivity to the same color. Image data that is captured by the two groups of pixels is brought to a common scale by a scaling unit before the image data is used to generate demosaiced image data. The scaled image data is used by a demosaic unit to determine intensity values for the first color at all of the pixel locations. Errors in the demosaiced intensity values that result from capturing the first color image data with pixels of two different sensitivities are corrected by an error correction unit to generate a final image that accurately depicts the original high contrast color image.

17 Claims, 7 Drawing Sheets

| Bit No. | R | $G_1$ | $G_2$ | B |
|---|---|---|---|---|
| 12 | O | O | X | O |
| 11 | X | O | X | X |
| 10 | X | X | X | X |
| 9 | X | X | X | X |
| 8 | X | X | X | X |
| 7 | X | X | X | X |
| 6 | X | X | X | X |
| 5 | X | X | X | X |
| 4 | X | X | X | X |
| 3 | X | X | X | X |
| 2 | X | X | O | X |
| 1 | O | X | O | O |

FIG. 7

| B | $G_1$ | B |
|---|---|---|
| $G_2$ | R | $G_2$ |
| B | $G_1$ | B |

$$G_{\text{red pixel location}} = (G_1 + G_2 + G_1 + G_2)/4$$

SYSTEM AND METHOD FOR CAPTURING COLOR IMAGES THAT EXTENDS THE DYNAMIC RANGE OF AN IMAGE SENSOR USING FIRST AND SECOND GROUPS OF PIXELS

FIELD OF THE INVENTION

The invention relates generally to digital imaging systems, and more particularly to digital imaging systems that are adapted to capture images with high contrast between bright and dark areas.

BACKGROUND OF THE INVENTION

Color digital imaging systems, such as digital cameras, typically employ a single image sensor, either a charged coupled device (CCD) or a complementary metal oxide semiconductor (CMOS) device, to digitally capture a scene of interest. Image sensors typically include an array of tightly spaced optical detectors, such as photodiodes, that generate an electrical response in proportion to the intensity of incident light. The dynamic range of the individual optical detectors is defined by the minimum amount of light that is required to generate an electrical response on the low end and the maximum amount of light beyond which the electrical response of the optical detector does not change (the saturation point) on the high end.

The dynamic range of an image sensor is an important characteristic when capturing high contrast images. When the bright and/or dark areas of an image exceed the dynamic range of the image sensor, the quality of the captured image suffers. If the sensitivity of the image sensor is adjusted (i.e., by decreasing the exposure time) to sufficiently capture the features of bright areas in an image, then the features of the dark areas are not captured. Likewise, if the sensitivity of the image sensor is adjusted (i.e., by increasing the exposure time) to sufficiently capture the features of dark areas in an image, then the features of the bright areas are not sufficiently captured.

Figure 1:
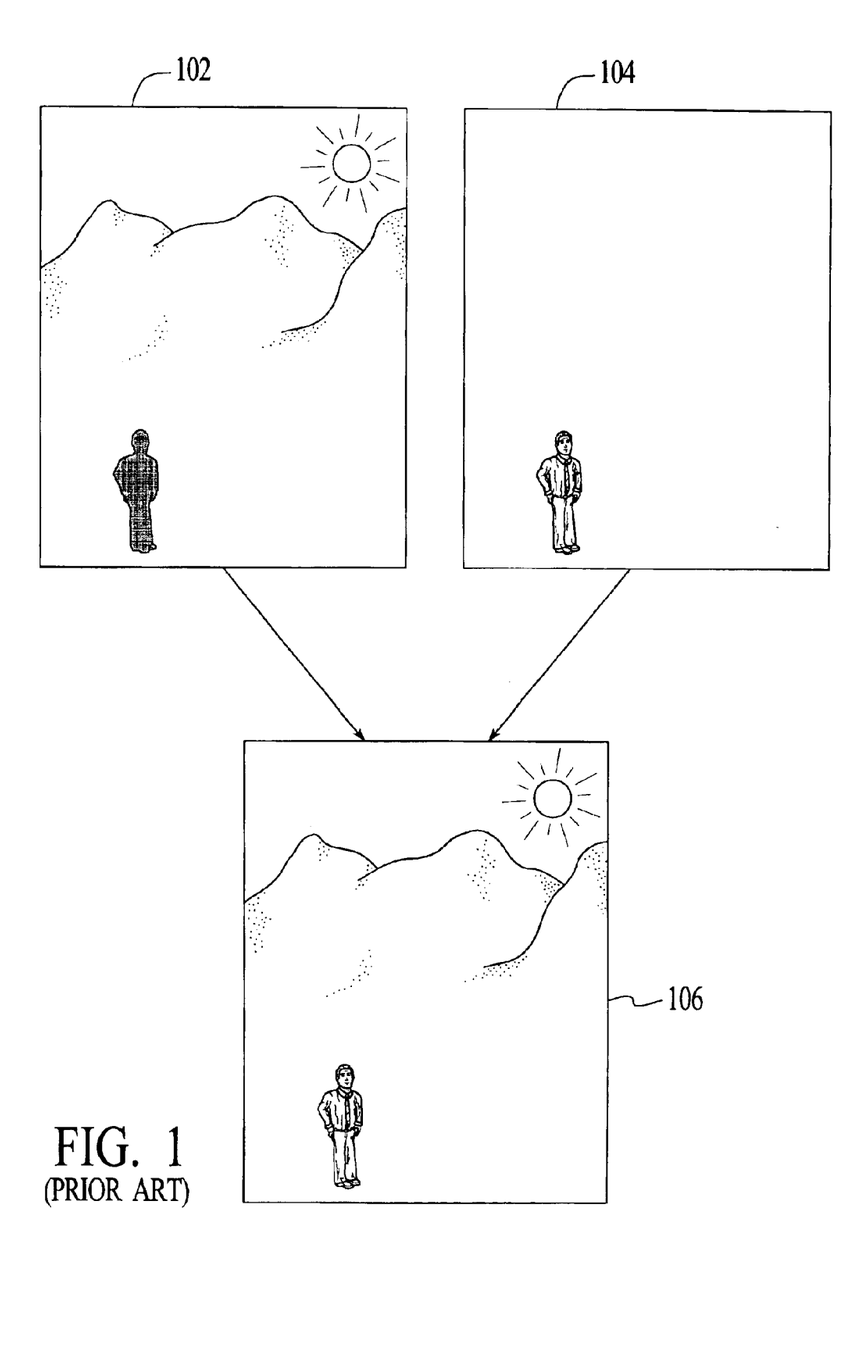
FIG. 1 depicts a prior art two-image technique in which the details of a first image and the details of a second image are used to generate a final image.

One known technique for capturing high contrast scenes with a digital image sensor involves capturing two images of the same scene in rapid succession, with the sensitivity of the image sensor set to capture the bright areas in a first image and the dark areas in a second image. The two images are then used to generate a composite image that includes features in both the bright and dark areas. FIG. 1 depicts an example of a two-image technique in which the features of bright areas (i.e., background scenery) are captured in a first image 102 using a first exposure time and the features of dark areas (i.e., a person in the foreground) are captured in a second image 104 using a second exposure time. Features of the bright areas from the first image and features of the dark areas from the second image are then used to generate a combined image 106 that includes features of both the bright and dark areas.

Although the two-image technique can extend the dynamic range of an image sensor, the technique requires enough memory to store two images before the combined image is generated and enough processing power to generate the combined image. In addition to the memory and processing requirements of the two-image technique, any changes in the scene that occur between the capturing of the first and second images will degrade the quality of the combined image.

In view of the problems involved with capturing high contrast color images with digital imaging systems, what is needed is a system and method for extending the dynamic range of digital imaging systems.

SUMMARY OF THE INVENTION

A method and system for extending the dynamic range of a digital imaging system involves simultaneously capturing image data from bright and dark areas of a high contrast image using an image sensor with pixels that have different sensitivities to the bright and dark areas. The image data from the different sensitivity pixels is then used to generate a final image that includes features from both the bright and dark areas. Because the technique captures all of the image data simultaneously with one image sensor, the technique requires half the time and half the memory of conventional two-image techniques. Because there is no need to merge multiple images into a final image, the technique requires less processing power and time than the two-image techniques. Additionally, because all of the image data is captured simultaneously, the temporal consistency of the image data is maintained even if the scene includes significant motion.

An embodiment of a digital imaging system includes an image sensor with a first group of pixels that have a first sensitivity to a first color and a second group of pixels that have a second sensitivity to the same color. Image data that is captured by the two groups of pixels is brought to a common scale before the image data is used to generate demosaiced image data. The scaled image data is used in a demosaicing process to determine intensity values for the first color at all of the pixel locations. Errors in the demosaiced intensity values that result from capturing the first color image data with pixels of two different sensitivities are corrected to generate a final image that accurately depicts the original high contrast color image.

A method for capturing a color image with a digital imaging system involves capturing color-specific image data with a first group of pixels that have a first light sensitivity and simultaneously capturing color-specific image data with a second group of pixels that have a second light sensitivity, wherein the color-specific image data from the first group of pixels and the color-specific image data from the second group of pixels are for a first color and wherein the first and second light sensitivities include a common dynamic range. In additional steps, the image data from the first group of pixels and the image data from the second group of pixels is brought to a common scale, intensity values of the first color are determined for pixels using the scaled color-specific image data, and determined intensity values that are outside the common dynamic range of the first and second groups of pixels are corrected.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 2:
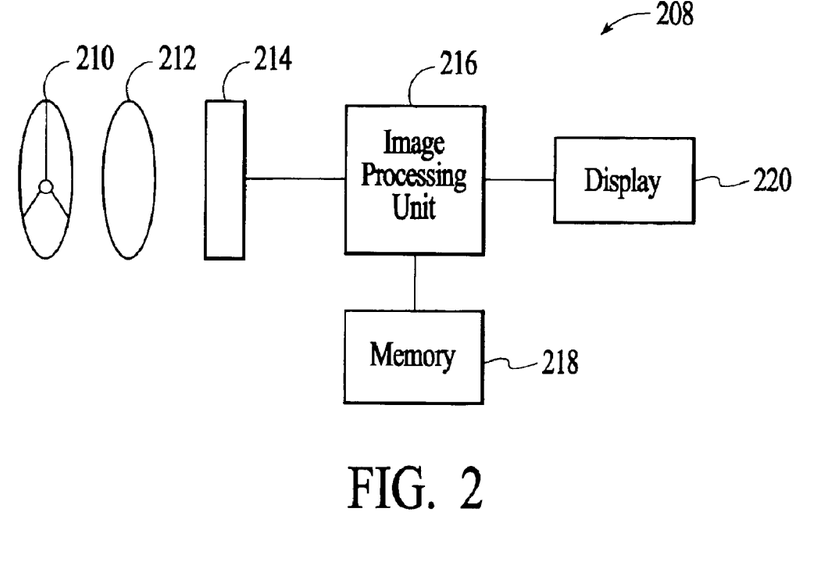
FIG. 2 depicts a digital imaging system that is used to capture color digital images.

FIG. 2 depicts a digital imaging system 208 that is used to capture color digital images. The digital imaging system includes a shutter 210, imaging optics 212, an image sensor 214, an image processing unit 216, memory 218, and a display 220. In an embodiment, the digital imaging system is a hand-held digital camera that is used to capture still digital images. In another embodiment, the digital imaging system is a digital video camera that is used to capture digital video.

The shutter 210 and imaging optics 212 are conventional devices that are well known in digital imaging systems. Likewise, the memory 218 and display 220 are conventional devices that are well known in digital imaging systems. In an embodiment, the shutter, imaging optics, memory, and display are integrated with the image sensor 214 and the image processing unit 216 into a digital camera. The image sensor and image processing unit are the focus of the invention and are described in more detail below.

The image sensor 214 is an array of individual optical detectors, referred to as pixels, which individually detect light and generate electrical responses in proportion to the amount of incident light. Common optical detectors include CCDs and CMOS devices. Both CCD and CMOS devices are only sensitive to illumination. Consequently, these optical detectors cannot discriminate between different colors. In order to achieve color discrimination, a color filtering technique can be applied to separate light in terms of primary colors, typically red, green, and blue. A common filtering technique utilizes a color-filter array (CFA), which is overlaid on the image sensor, to separate colors of incident light in a Bayer pattern. A Bayer pattern is a periodic pattern with a period of two different color pixels in each dimension (vertical and horizontal). In the horizontal direction, a single period includes either a green pixel and a red pixel, or a blue pixel and a green pixel. In the vertical direction, a single period includes either a green pixel and a blue pixel, or a red pixel and a green pixel. In an image sensor that utilizes the Bayer pattern, the number of green pixels is twice the number of red or blue pixels. The reason for the disparity in the number of green pixels is that the human eye is not equally sensitive to red, green, and blue. Consequently, more green pixels are needed to create a color image of a scene that will be perceived as a "true color" image.

Figure 3:
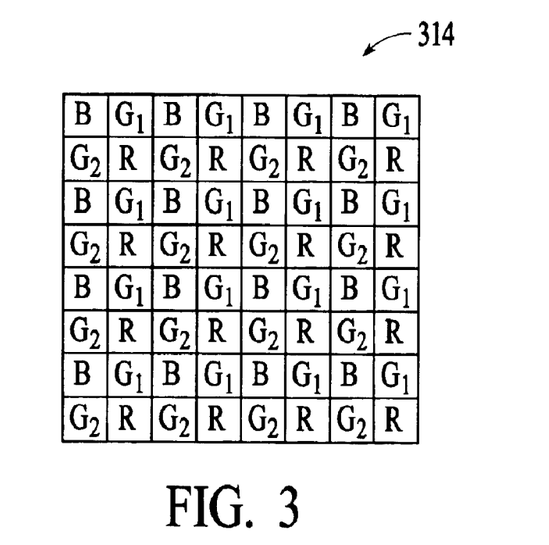
FIG. 3 depicts an array of color-specific pixels that includes a distribution of green pixels with two different sensitivities in accordance with an embodiment of the invention.

FIG. 3 depicts an array of color-specific pixels 314 that includes a distribution of green pixels ($G_1$ and $G_2$), with two different sensitivities. In the embodiment of FIG. 3, a Bayer pattern pixel distribution is used such that the number of green pixels is twice the number of red or blue pixels. In the horizontal direction, one period includes a blue pixel (B) and a green pixel with a first sensitivity ($G_1$) and the other period includes a green pixel with a second sensitivity ($G_2$) and a red pixel (R). In the vertical direction, one period includes a blue pixel (B) and a green pixel with the second sensitivity ($G_2$) and the other period includes a green pixel with the first sensitivity ($G_1$) and a red (R) pixel. Given the above described green pixel distribution, over a large surface area of the image sensor, the total number of $G_1$ pixels is approximately equal to the total number of $G_2$ pixels. The ratio of $G_1$ pixels to $G_2$ pixels is an important factor in the error correction process described below. Although the color spectrum of the image sensor is divided into red, green, and blue, in other embodiments, the color spectrum can be divided differently.

In the embodiment of FIG. 3, the $G_1$ pixels are more sensitive to the dark (or shadow) areas of a scene and the $G_2$ pixels are more sensitive to the bright (or highlight) areas of a scene. That is, the $G_1$ pixels are better adapted to distinguish the features in dark areas of a scene while the $G_2$ pixels are better adapted to distinguish the features in bright areas of a scene. In an embodiment, the $G_1$ pixels are four times as sensitive as the $G_2$ pixels, such that the sensitivity ratio of the $G_1$ pixels to the $G_2$ pixels is 1:4. For example, when the $G_1$ and $G_2$ pixels are exposed to the same intensity of light for the same period of time, the $G_2$ pixels generate output values that are four times higher than the output values of the $G_1$ pixels.

In an embodiment, the sensitivity of the pixels is determined by amplifier circuits within the image sensor. In adjustable image sensors, the gain of the pixel amplifier circuits can be adjusted through control signals that are sent to the image sensor. Preferably, the amplifier gain for the different color pixels is set at the center of the dynamic range of the particular color that is targeted by the pixels. For example, the amplifier gain of the red pixels is set to the expected center of the red dynamic range. In an embodiment, the gain of the $G_1$ and $G_2$ pixels can be adjusted to account for the expected level of contrast in the image that is to be captured. The adjusted gain of the $G_1$ and $G_2$ pixels must be reflected in the scales of the $G_1$ and $G_2$ output fields. Scaling of the pixel output fields is described in more detail below.

Figure 4:
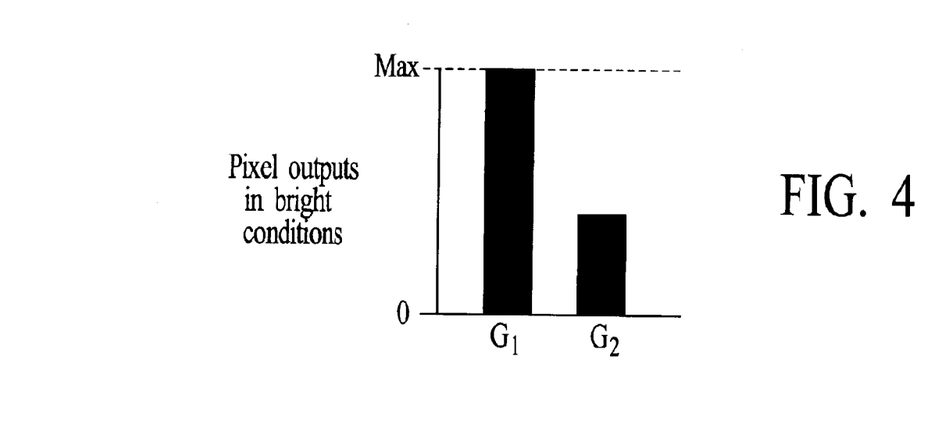
FIG. 4 depicts example outputs from a $G_1$ pixel and a $G_2$ pixel relative to their minimum and maximum outputs when the pixels are subjected to relatively bright light.

FIG. 4 depicts example outputs from a $G_1$ pixel and a $G_2$ pixel relative to their minimum and maximum outputs when the pixels are subjected to the same amount of relatively bright light. As shown in FIG. 4, the bright light exceeds the top end of the $G_1$ pixel dynamic range and therefore the output of the $G_1$ pixel is a value that does not accurately reflect the intensity of the incident light. Specifically, the output of the $G_1$ pixel is limited to the maximum value possible in the dynamic range of the $G_1$ pixel. For example, if the pixel has a 10-bit output field, the output value of the $G_1$ pixel in the bright conditions is 1,023. In contrast, the bright light does not exceed the dynamic range of the $G_2$ pixel and therefore the output of the $G_2$ pixel is a valid output that accurately reflects the intensity of the incident bright light. Because the $G_1$ pixels produce inaccurate outputs in bright conditions, errors in the image data generated from the optical sensor of FIG. 3 should be corrected in the final image. A technique for correcting the errors is described below with reference to FIGS. 9 and 10.

Figure 5:
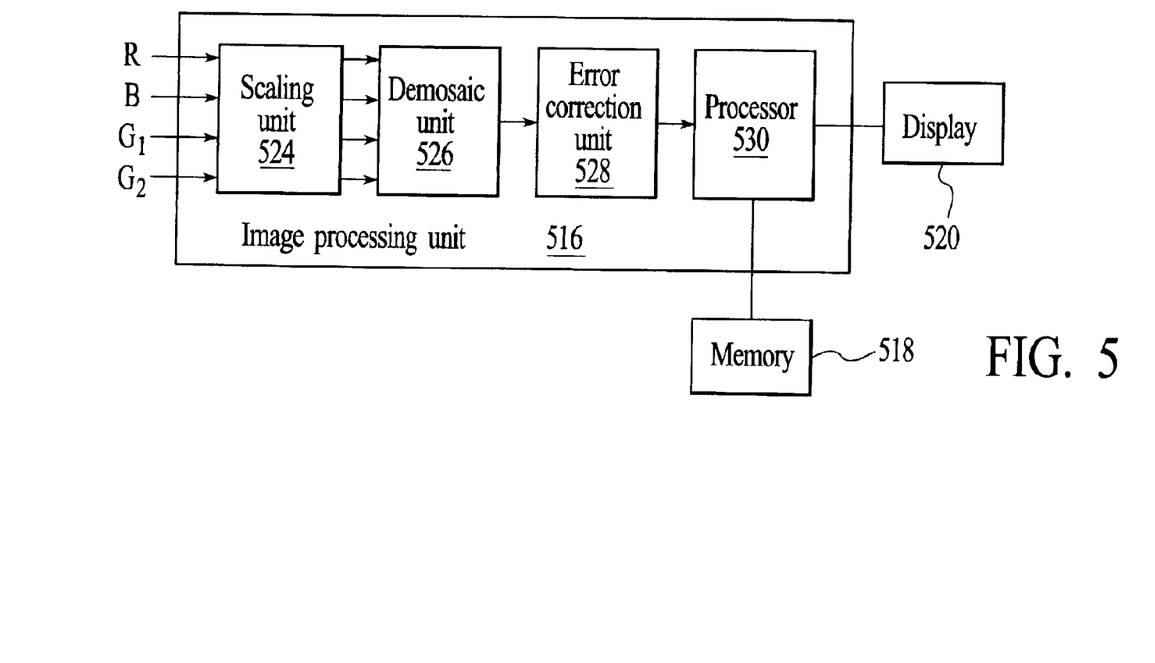
FIG. 5 is an expanded view of an embodiment of the image processing unit of FIG. 2 in accordance with an embodiment of the invention.

Referring back to FIG. 2, image data generated from the image sensor 214 is forwarded to the image processing unit 216. The image processing unit receives image data from the image sensor and uses the image data to generate a complete set of image data that can be used to display a final image. FIG. 5 is an expanded view of an embodiment of the image processing unit of FIG. 2. In the embodiment of FIG. 5, the image processing unit 516 includes a scaling unit 524, a demosaic unit 526, an error correction unit 528, and a processor 530.

Figure 6:
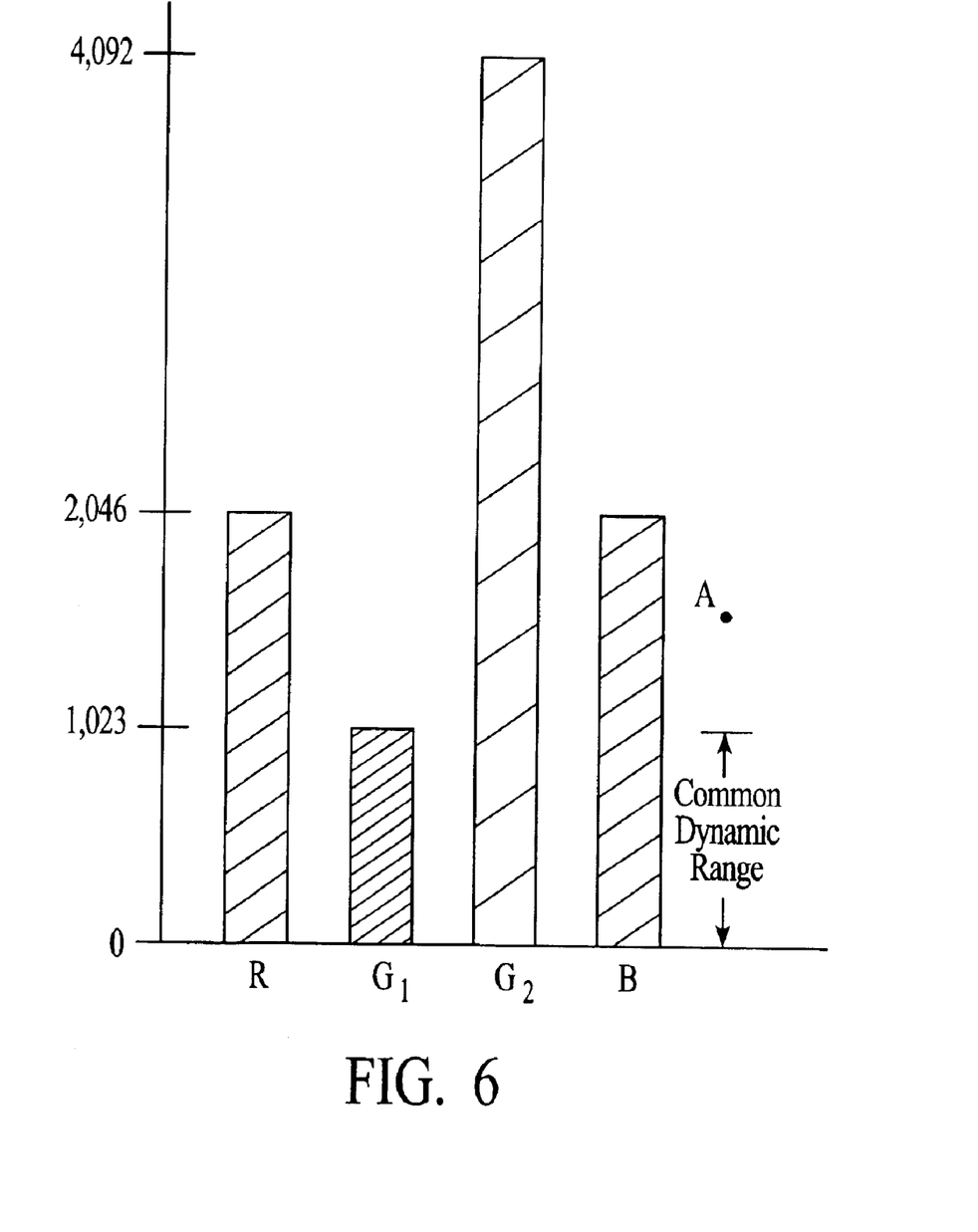
FIG. 6 depicts the relative scales of the output values of the R, $G_1$, $G_2$, and B pixels shown in FIG. 3 in the case where the pixels have 10-bit output fields and the ratio of the sensitivities of the $G_1$ and $G_2$ pixels is 1:4 ($G_1/G_2=\frac{1}{4}$).
Figure 7:
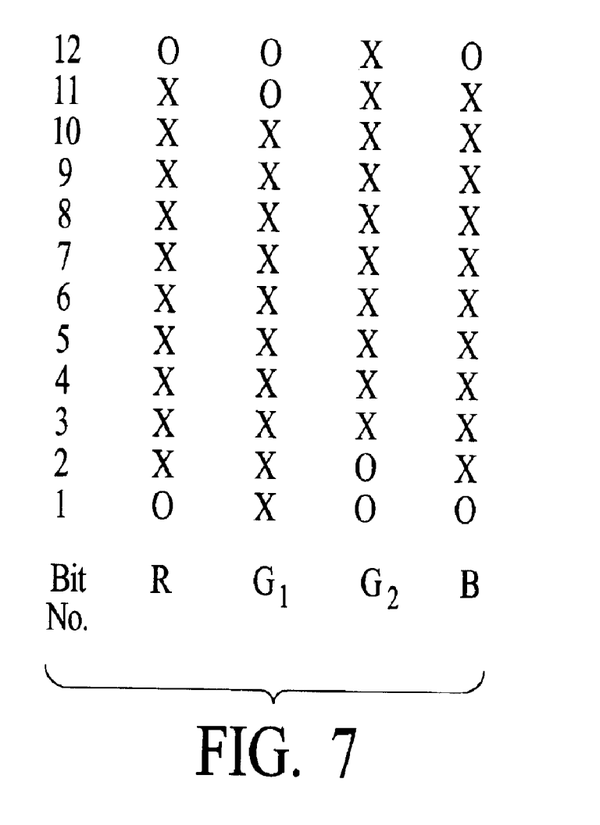
FIG. 7 depicts the scaled 12-bit output fields of the R, $G_1$, $G_2$, and B pixels shown if FIG. 6.

The scaling unit 524 scales the outputs from the red, green, and blue pixels so that all of the output values are on a common scale. FIG. 6 depicts the relative dynamic ranges of the R, $G_1$, $G_2$, and B pixels on a $\log_2$ scale in the case where 10-bit output fields have been scaled to a common 12-bit output field. FIG. 7 depicts the 12-bit scaled output fields of the R, $G_1$, $G_2$, and B pixels relative to each other. With respect to the $G_1$ and $G_2$ output values, FIG. 6 depicts the relative scales of the output values of the $G_1$ and $G_2$ pixels, in the case where the ratio of the sensitivities of the $G_1$ and $G_2$ pixels is 1:4 ($G_1/G_2=¼$). That is, when the $G_1$ and $G_2$ pixels are exposed to the same intensity of light for the same period of time, the $G_2$ pixel output values are four times higher than the $G_1$ pixel output values. Given the sensitivity ratio of 1:4, the output values of the $G_1$ and $G_2$ pixels can be brought to a common scale by adding two bits (both zero) to the top end of the $G_1$ output field and by adding two bits (both zero) to the bottom end of the $G_2$ output field, such that the 12-bit output field of the $G_1$ pixels is:

$G_1$: 00 XX XX XX XX XX, and the 12-bit output field of the $G_2$ pixels is:

$G_2$: XX XX XX XX XX 00.

As shown in FIG. 6, the scaled $G_1$ pixels cover a range of values from 0–1,023 and the scaled $G_2$ pixels cover a range of values from 0–4,092. When the pixels are used in combination, the total dynamic range covered by the combination of the $G_1$ and $G_2$ pixels includes values 0–4,092. That is, the 10-bit output fields of the $G_1$ and $G_2$ pixels are synthetically made to appear as 12-bit output fields when the $G_1$ and $G_2$ pixels are used in combination on the same image sensor. Although the total dynamic range of the $G_1$ and $G_2$ pixels is 0–4,092, the top end of the common dynamic range is set by the $G_1$ pixels at a maximum value of 1,023, which is the maximum value of the 12-bit output field with the two most significant bits set to zero. The red and blue pixels (R and B) are brought to the same scale as the green pixels by adding two bits to the 10-bit output fields to make 12-bit output fields. In the embodiment shown in FIGS. 6 and 7, the red and blue pixels are brought to the common scale by adding one bit (a zero bit) to the top end of the R and B output fields and by adding one bit (a zero bit) to the bottom end of the R and B output fields. Given this scaling, the 12-bit output fields of the R and B pixels are:

R and G: 0X XX XX XX XX X0.

The relative resolution of the R, $G_1$, $G_2$, and B pixels is indicated by the density of the hatching in the bars of FIG. 6. Specifically, the resolution of the $G_1$ pixels is the highest (as indicated by the relatively dense hatching), the resolution of the $G_2$ pixels is the lowest (as indicated by the relatively wide hatching), and the resolution of the R and B pixels is between the $G_1$ and $G_2$ pixels.

Figure 8:
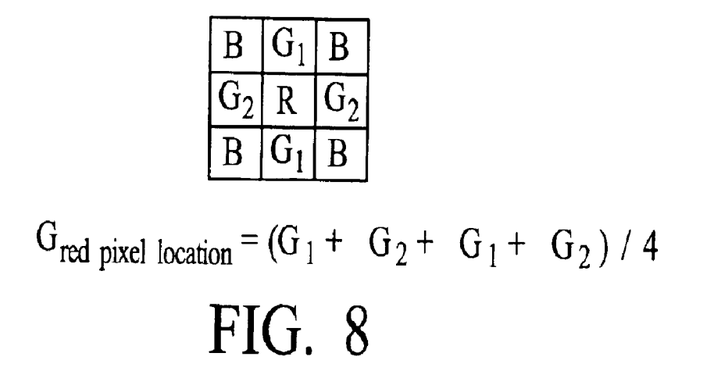
FIG. 8 depicts an array of color-specific pixels that can be used to calculate a demosaiced green intensity value for the red pixel.

Referring back to FIG. 5, once all of the pixel values are brought to a common scale, the pixel values for the R, $G_1$, $G_2$, and B pixels are forwarded to the demosaic unit 526 as a mosaiced image. The demosaic unit operates to demosaic the input mosaiced image such that each pixel of the resulting demosaiced image has an intensity value for all three primary colors (red, green, and blue). That is, each pixel of the demosaiced image should have an intensity value for red, green, and blue. The demosaic unit estimates the missing intensity values for each pixel of the input mosaiced image using available intensity values from surrounding pixels of the same color. There are many different demosaicing techniques and algorithms that can be used in conjunction with the image sensor of FIG. 3 to generate a demosaiced image. One basic demosaicing technique involves calculating an intensity value for a particular color by finding the average intensity value of nearby pixels of the same color. Referring to FIG. 8 for example, a green intensity value for a red pixel location can be calculated as the average green pixel value for the immediately surrounding $G_1$ and $G_2$ pixels. That is, the green intensity value for the red pixel shown in FIG. 8 is calculated as $G_{red\ pixel\ location}=(G_1+G_2+G_1+G_2)/4$. Although the calculation described with reference to FIG. 8 takes only four green pixel values into consideration, typical demosaicing techniques use a larger set of pixel values to determine an intensity value.

The output of the demosaic unit is a demosaiced image that includes red, green, and blue intensity values for each pixel location. As described above with reference to FIG. 4, the green $G_1$ pixels are more sensitive to dark areas and will give range-limited output values (i.e., 1,023) for bright areas that exceed the top end of the $G_1$ pixel dynamic range. The range-limited output values will cause the demosaiced green intensity values that exceed the top end of the common dynamic range to be artificially low. Because some of the demosaiced intensity values related to bright areas include artificially low values, the image that is output from the demosaic unit may still lack the full dynamic range that is covered by the $G_1$ and $G_2$ pixels.

The error correction unit 528 corrects the intensity value errors that result from using a distribution of pixels with two different sensitivities. Referring to FIG. 6, if the demosaiced green intensity value of a pixel exceeds the top end of the common dynamic range of the $G_1$ and $G_2$ pixels (i.e., point A), then it can be assumed that light incident on at least some of the $G_1$ pixels exceeds the top end of the $G_1$ pixel dynamic range. Although the light exceeds the top end of the $G_1$ pixel dynamic range, the output of the $G_1$ pixels is range-limited to 1,023 and therefore the demosaiced green intensity value is held artificially low. Because the $G_2$ pixels are more sensitive to bright areas, it can be assumed that the $G_2$ pixels give accurate output values in response to the incident light.

Figure 9:
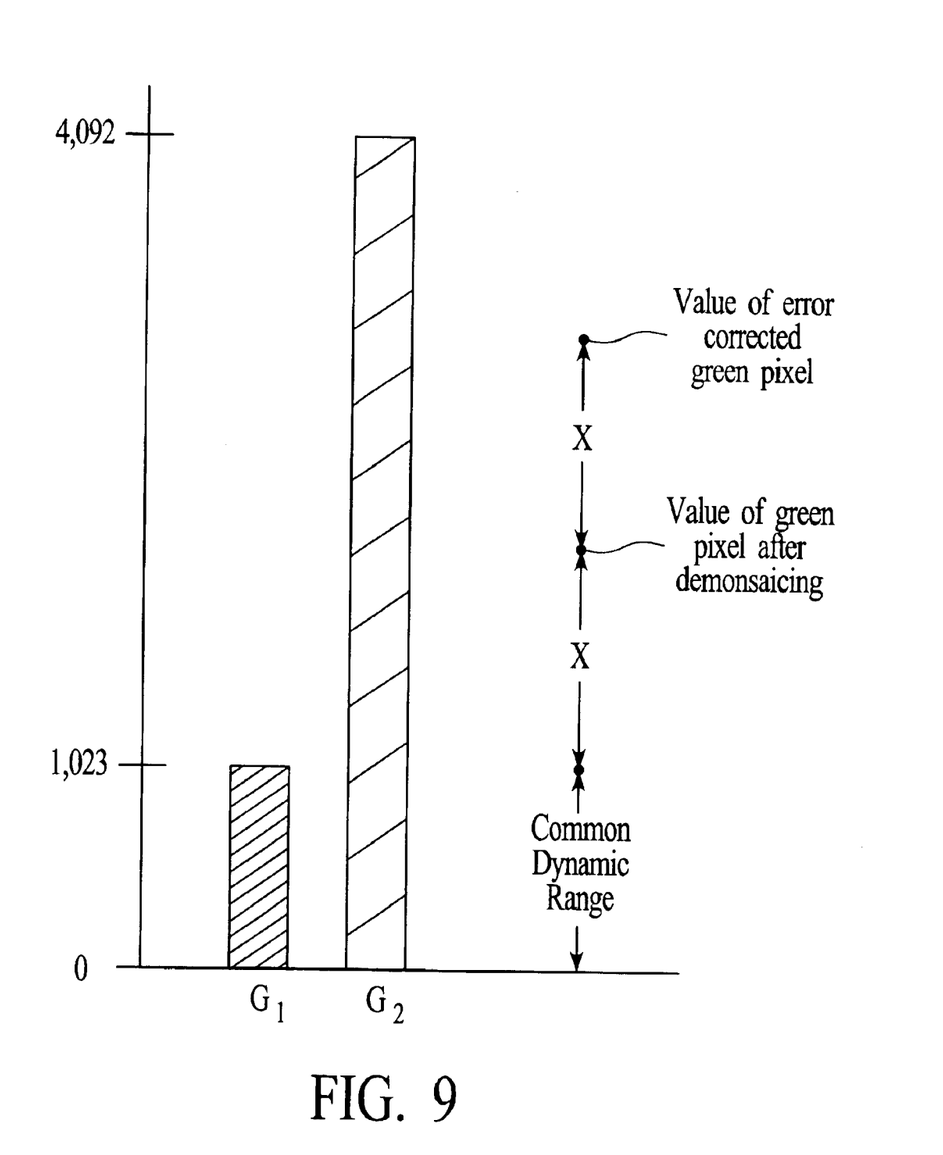
FIG. 9 depicts an example error correction scheme for a demosaiced green intensity value that exceeds the top dynamic range of the $G_1$ pixels.

In an embodiment of an image sensor in which the number of $G_1$ pixels is approximately equal to the number of $G_2$ pixels per unit of surface area on the image sensor, the demosaiced green intensity values that exceed the common dynamic range of the $G_1$ and $G_2$ pixels represent approximately one-half of the difference between the accurate $G_2$ pixel values and the top end of the $G_1$ dynamic range. This is because one-half of the pixel values used for demosaicing are the $G_2$ pixel values (representing valid readings) and the other one-half of the pixel values used for demosaicing are the $G_1$ pixel values, which are range-limited to a maximum output value of 1,023. In order to correct the error in a demosaiced green intensity value, the difference between the demosaiced green intensity value and the maximum intensity value of the $G_1$ pixels (i.e., the top of the common dynamic range) is doubled to generate the error corrected green intensity value. FIG. 9 depicts the error correction for a demosaiced green intensity value that exceeds the dynamic range of the $G_1$ pixels. As shown in FIG. 9, if the demosaiced green intensity value exceeds the maximum intensity value of the $G_1$ pixels by X, then the error corrected green intensity value is doubled such that the final demosaiced green intensity value exceeds the maximum intensity value of the $G_1$ pixels by 2X. Although in the example of FIG. 9 the error corrected intensity value is determined by a linear function, in other embodiments, error corrected intensity values can be determined by a non-linear function [f(x)].

In an embodiment, the demosaiced green intensity values that are within the common dynamic range are not error corrected and the demosaiced green intensity values that are outside of the common dynamic range are error corrected but not beyond the top end of the $G_2$ dynamic range.

The processor 530 may perform additional image processing on the capture image data. In an embodiment, the processor supports the demosaic unit 526 and the error correction unit 528.

Figure 10:
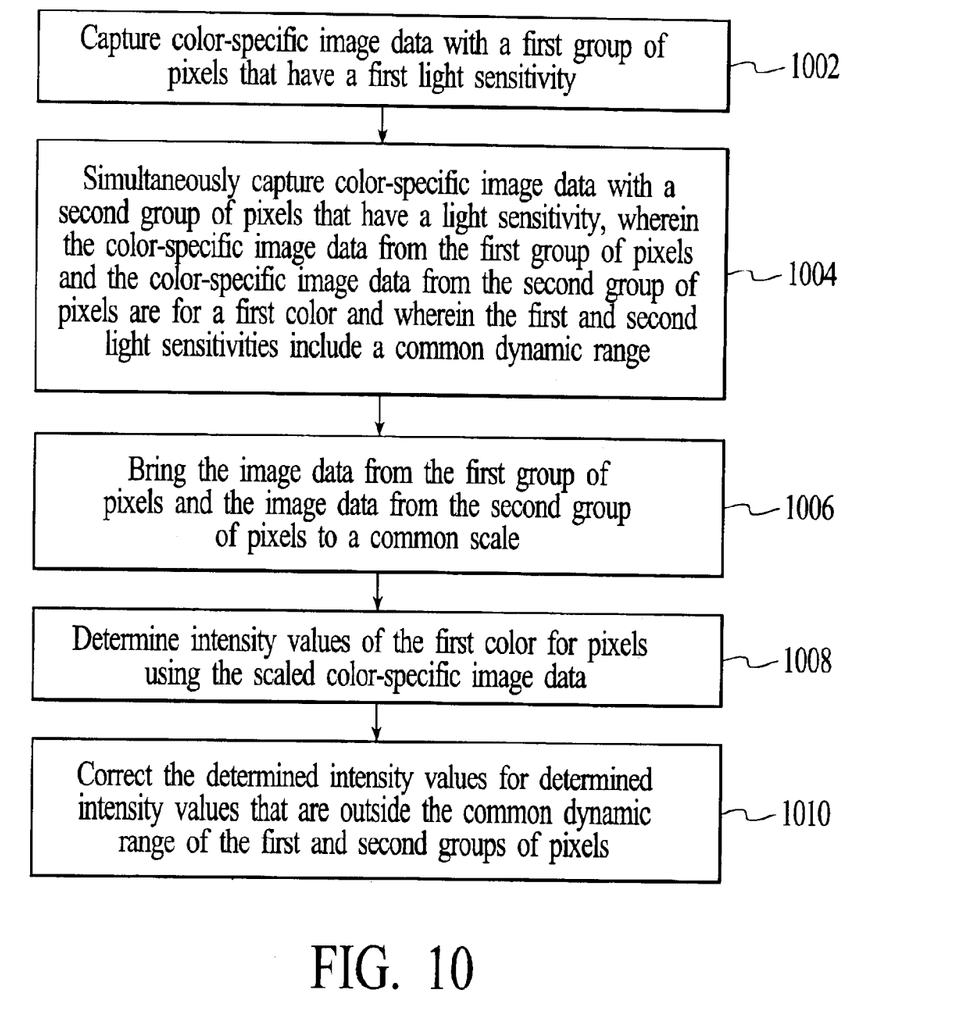
FIG. 10 depicts a process flow diagram of a method for capturing a color image with a digital imaging system in accordance with an embodiment of the invention.

FIG. 10 depicts a process flow diagram of a method for capturing a color image with a digital imaging system in accordance with an embodiment of the invention. At step 1002, color-specific image data is captured with a first group of pixels that have a first light sensitivity. At step 1004 color-specific image data is simultaneously captured with a second group of pixels that have a second light sensitivity, wherein the color-specific image data from the first group of pixels and the color-specific image data from the second group of pixels are for a first color and wherein the first and second light sensitivities include a common dynamic range. At step 1006, the image data from the first group of pixels and the image data from the second group of pixels are brought to a common scale. At step 1008, intensity values of the first color are determined for pixels using the color-specific image data from the first and second groups of pixels. At step 1010, determined intensity values that are outside the common dynamic range of the first and second groups of pixels are corrected.

Although the process of scaling the red, green, and blue pixel output values to a common scale is described as coming before the process of demosaicing, this is not a requirement. In other embodiments, demosaicing can be done before the red, green, and blue pixel output values are brought to a common scale. Although the image sensor is described with pixels that have 10-bit output fields, the number of bits in the output field can be any number of bits. For example, 8-bit output fields may be used. Additionally, although a sensitivity/scaling ratio of 1:4 is described above, other sensitivity/scaling ratios may be used. For ease of scaling, ratios that are factors of two are preferred. For example, for scenes with extremely high contrast, the $G_1$ and $G_2$ pixels are scaled as described with reference to FIGS. 6 and 7 (i.e., shifting the $G_2$ pixels by two bits), however for scenes with less contrast, the $G_1$ and $G_2$ pixels can be scaled by shifting the 10-bit field of the $G_2$ pixels by one bit similar to the R and G pixels.

Although the distribution of green $G_1$ and $G_2$ pixels in the array of FIG. 3 is approximately even, in other embodiments of the array, the distribution of same-color pixels with different sensitivities may be uneven. In embodiments of uneven $G_1$ and $G_2$ pixel distribution, the function that is used to correct errors in the demosaiced green intensity values is adjusted as necessary to account for the uneven distribution. Additionally, although the green pixels are described with two different sensitivities, other color-specific pixels can be used with different sensitivities instead of, or in addition to, the green pixels.

What is claimed is:

1. A digital imaging system for capturing a color image comprising:
    an image sensor having;
        a first group of pixels that have a first light sensitivity for generating color-specific image data on a first scale for a first color; and
        a second group of pixels that have a second light sensitivity for generating color-specific image data on a second scale for the first color, the first and second group of pixels having a common dynamic range wherein the light sensitivity of the first group of pixels overlaps with the light sensitivity of the second group of pixels;
    a scaling unit for receiving the image data from the first group of pixels and the image data from the second group of pixels and for outputting the image data on a common scale;
    a demosaic unit for determining intensity values of the first color using the scaled color-specific image data that is generated from the first and second groups of pixels; and
    an error correction unit for correcting the demosaiced intensity values of the first color for the demosaiced intensity values of the first color that are outside the common dynamic range of the first and second groups of pixels;
    wherein the error correction unit corrects the demosaiced intensity values of the first color by increasing demosaiced intensity values that exceed the top end of the common dynamic range.

2. The digital imaging system of claim 1 wherein the image sensor has an even distribution of the first and second groups of pixels.

3. The digital imaging system of claim 2 wherein the error correction unit increases demosaiced intensity values that exceed the top end of the common dynamic range by twice the difference between the exceeding intensity value and the top end of the common dynamic range.

4. The digital imaging system of claim 1 wherein the sensitivity of the first and second groups of pixels is adjusted to account for the expected level of contrast in an image.

5. The digital imaging system of claim 1 wherein the first and second groups of pixels capture green image data at two different sensitivities.

6. The digital imaging system of claim 5 wherein the sensitivity ratio of the first group of pixels to the second group of pixels is 1:4.

7. The digital imaging system of claim 1 wherein the image sensor further includes a third group of pixels that captures image data of a second color and a fourth group of pixels that captures image data of a third color.

8. The digital imaging system of claim 7 wherein the first and second groups of pixels capture green image data, the third group of pixels captures red image data, and the fourth group of pixels captures blue image data.

9. An image processing unit for processing color image data that is received from an image sensor, wherein the color image data received from the image sensor includes pixel values for a first color on a first scale, pixel values for the first color on a second scale, pixel values for a second color, and pixel values for a third color, the first scale and the second scale include a common dynamic range, the image processing unit comprising:
    a scaling unit for ensuring that the pixel values for the first color on the first scale, the pixel values for the first color on the second scale, the pixel values for the second color, and the pixel values for the third color are all on the same scale;

a demosaic unit for receiving the pixel values for the first color, the pixel values for the second color, and the pixel values for the third color and for generating missing intensity values for the first, second, and third colors using the pixel values for the first color, the second color, and the third color; and an error correction unit for correcting the demosaiced intensity values of the first color that are outside of the common dynamic range of the first color pixel values;

wherein the error correction unit corrects the demosaiced intensity values of the first color by increasing demosaiced intensity values that exceed the top end of the common dynamic range.

10. The digital imaging system of claim 9 wherein:

the image sensor has an even distribution of the first and second groups of pixels; and the error correction unit increases demosaiced intensity values that exceed the top end of the common dynamic range by a function of the difference between the exceeding intensity value and the top end of the common dynamic range.

11. A method for capturing a color image with a digital imaging system comprising:

capturing color-specific image data with a first group of pixels that have a first light sensitivity;

simultaneously capturing color-specific image data with a second group of pixels that have a second light sensitivity, wherein the color-specific image data from the first group of pixels and the color-specific image data from the second group of pixels are for a first color and wherein the first and second light sensitivities include a common dynamic range;

bringing the image data from the first group of pixels and the image data from the second group of pixels to a common scale;

determining intensity values of the first color for pixels using the scaled color-specific image data; and correcting the determined intensity values for determined intensity values that are outside the common dynamic range of the first and second groups of pixels;

wherein the step of correcting includes increasing intensity values that exceed the top end of the common dynamic range.

12. The method of claim 11 wherein the step of increasing intensity values that exceed the top end of the common dynamic range includes increasing an intensity value that exceeds the top end of the common dynamic range by twice the difference between the exceeding intensity value and the top end of the common dynamic range.

13. The method of claim 11 further including a step of adjusting the sensitivity of the first and second groups of pixels to account for the expected level of contrast in an image.

14. The method of claim 11 wherein the first and second groups of pixels capture green image data at two different sensitivities.

15. The method of claim 12 wherein the sensitivity ratio of the first group of pixels to the second group of pixels is 1:4.

16. The method of claim 11 further including a third group of pixels that captures image data of a second color and a fourth group of pixels that captures image data of a third color.

17. The method of claim 16 wherein the first and second groups of pixels capture green image data, the third group of pixels captures red image data, and the fourth group of pixels captures blue image data.

* * * * *